US010359140B2

(12) United States Patent
Flynn et al.

(10) Patent No.: US 10,359,140 B2
(45) Date of Patent: Jul. 23, 2019

(54) FEEDBACK BULKHEAD CONNECTOR ASSEMBLY

(71) Applicant: Eaton Corporation, Cleveland, OH (US)

(72) Inventors: William T. Flynn, Horton, MI (US); Daniel Gates, Rockaway, NJ (US); Thomas A. Parrish, Parma, MI (US)

(73) Assignee: Eaton Intelligent Power Limited (IE)

( * ) Notice: Subject to any disclaimer, the term of this patent is extended or adjusted under 35 U.S.C. 154(b) by 303 days.

(21) Appl. No.: 15/304,510

(22) PCT Filed: Apr. 15, 2015

(86) PCT No.: PCT/IB2015/052725
§ 371 (c)(1),
(2) Date: Oct. 14, 2016

(87) PCT Pub. No.: WO2015/159228
PCT Pub. Date: Oct. 22, 2015

(65) Prior Publication Data
US 2017/0037992 A1  Feb. 9, 2017

Related U.S. Application Data

(60) Provisional application No. 61/979,654, filed on Apr. 15, 2014.

(51) Int. Cl.
*F16L 37/113* (2006.01)
*F16L 27/12* (2006.01)
(Continued)

(52) U.S. Cl.
CPC .......... *F16L 37/113* (2013.01); *F16L 27/125* (2013.01); *F16L 37/505* (2013.01); *F16L 25/01* (2013.01); *F16L 2201/10* (2013.01)

(58) Field of Classification Search
CPC ...................... F16L 2201/10; F16L 37/113
(Continued)

(56) References Cited

U.S. PATENT DOCUMENTS 266,359 A * 10/1882 Gotzel ............... F16L 37/252
285/376
322,286 A * 7/1885 Hemje ............... F16L 37/252
285/401
(Continued)

FOREIGN PATENT DOCUMENTS

| FR | 1096471 A * | 6/1955 | ............ F16L 37/113 |
| WO | WO-2012088055 A1 | 6/2012 | |
| WO | WO-2015119509 A1 * | 8/2015 | ............ F16L 37/113 |

OTHER PUBLICATIONS

English abstract for DE-20313792.
International Search Report for PCT/IB2015/052725, dated Jul. 17, 2015.

*Primary Examiner* — David Bochna
(74) *Attorney, Agent, or Firm* — Fishman Stewart PLLC

(57) ABSTRACT

An exemplary bulkhead (104A) connector assembly (100) includes a housing (106) having a first opening (138) and a second opening (130). The assembly (100) may further include a collar (108) that has a portion received within one of the first and second openings. The collar (108) may be rotatable to a latched position to hold a conduit (104B) within the housing (106). Further, the assembly (100) may have a detent (118) holding the collar (108) in the latched position when the detent (118) is moved to a locked position. The detent (118) in the locked position may have an indicator surface (112) providing tactile feedback indicative of the detent (118) holding the collar (108) in the latched position.

19 Claims, 12 Drawing Sheets

(51) Int. Cl.
*F16L 37/50* (2006.01)
*F16L 25/01* (2006.01)

(58) Field of Classification Search
USPC ..................... 285/401, 376, 93, 91
See application file for complete search history.

(56) References Cited

U.S. PATENT DOCUMENTS

| | | | | |
|---|---|---|---|---|
| 628,765 A * | 7/1899 | Collette | ................ | F16L 37/252 285/376 |
| 789,541 A * | 5/1905 | Hayes | ................... | F16L 37/252 285/376 |
| 807,417 A * | 12/1905 | Caskey | ................ | F16L 37/113 285/106 |
| 815,627 A * | 3/1906 | Oldham | ................ | F16L 37/252 285/376 |
| 939,211 A * | 11/1909 | Brown | ................ | F16L 37/107 285/376 |
| 2,647,768 A * | 8/1953 | Exton | ................... | F16L 37/252 285/376 |
| 2,684,860 A * | 7/1954 | Rafferty | ................ | F16L 37/248 285/376 |
| 3,069,187 A * | 12/1962 | Collims | ................ | F16L 17/063 285/93 |
| 3,162,470 A * | 12/1964 | Owens | ................ | F16L 37/113 285/376 |
| 3,428,340 A | 2/1969 | Pelton | | |
| 3,948,545 A * | 4/1976 | Bonds | ................... | F16L 37/002 285/91 |
| 3,995,889 A * | 12/1976 | Carr | ...................... | F16L 37/252 285/91 |
| 4,185,856 A * | 1/1980 | McCaskill | ............ | E21B 17/085 285/376 |
| 4,271,865 A * | 6/1981 | Galloway | ............ | F16L 37/101 285/401 |
| 4,643,459 A * | 2/1987 | Carson | ................ | F16L 37/252 285/376 |
| 4,991,880 A | 2/1991 | Bernart | | |
| 7,597,362 B2 | 10/2009 | Hartmann | | |
| 2011/0225789 A1 | 9/2011 | Darnell | | |

* cited by examiner

FEEDBACK BULKHEAD CONNECTOR ASSEMBLY

CROSS REFERENCE TO RELATED APPLICATIONS

This application is a US National Phase Application of PCT/IB2015/052725, filed on Apr. 15, 2015, which claims priority to U.S. Provisional Patent Application No. 61/979,654, filed Apr. 15, 2014, both of which are hereby incorporated by reference in their entirety.

FIELD

Adjustable joints or fittings for tube assemblies are disclosed, wherein the joints provide feedback indicating a connection between sections of tubing.

BACKGROUND

Fuel handling systems on aircrafts include tubing assemblies that have sections of metallic and/or non-metallic composite tubing coupled to one another by adjustable connectors. The systems can include support devices that attach the tubing assemblies to aircraft structures, such as wing structures, which move or vibrate relative to other aircraft structures during normal flight. The adjustable connectors permit tubing fitted therein to move or vibrate, thereby permitting the associated aircraft structure to move without applying additional loads to the same or restricting its normal motion.

Moreover, typical fuel handling systems further include an electrical bonding system, which safely transmits electrical charges that would otherwise build and collect in the adjustable connectors and associated fuel handling components. In particular, lightning strikes and the conveyance of fuel through the tubing can create an electrical potential between the tubing and the aircraft skin or structure, which can result in an electrical discharge in the form of a spark that can damage certain aircraft components. The electrical bonding system electrically connects the adjustable connectors and remaining fuel handling components to the electrical bonding grid of the aircraft. In this way, the electrical bonding system can safely transmit the electrical charges that are generated and collected in the fuel handling systems and thus prevent the associated spark that can damage the aircraft.

The adjustable connectors can facilitate the conveyance of fluid, while permitting vibrations, flow of electro-static currents and thermal expansion and contraction, when the adjustable connectors are properly installed in fully engaged positions and remain fully engaged during normal operation of the aircraft. Installation of these adjustable connectors can require access to a significant number of narrow spaces within aircraft structures. In this respect, it can be somewhat cumbersome to confirm the proper connection between tubing sections of the fluid handling system. It would therefore be desirable to provide a bulkhead connector assembly that fully connects mating tubing sections of a fluid handling system and provides one or more forms of feedback that confirm the connection between those tubing sections.

SUMMARY OF THE EMBODIMENTS

An exemplary bulkhead connector assembly includes a housing and a collar, which are configured to connect corresponding fluid handling components to one another. The housing has first and second openings, and the collar has a portion received within the first opening or the second opening. The collar may be rotatable to a latched position to hold the component within the housing and fluidly communicate the corresponding fluid handling components with each another. Furthermore, the assembly may have a detent that is movable to a locked position to hold the collar in the latched position. The detent in the locked position may also have an indexing surface providing feedback at least in tactile form to indicate that the detent is holding the collar in the latched position.

Another exemplary bulkhead connector assembly may include a housing, which has first and second openings, and a collar, which has a portion received within the first opening or the second opening. The assembly may also have a connection indicator that is movable to an engaged position when the collar is received in the housing. The connection indicator in the engaged position may have an indicator surface that is offset from or co-planar with an adjacent surface portion of the collar so as to provide feedback indicating a connection between corresponding fluid handling components to one another.

Still another exemplary bulkhead connector assembly may include a housing, which has first and second openings, and a collar, which has a portion received within the first opening or the second opening. The collar can be rotatable to a latched position to hold a conduit within the housing. The assembly can further have a connection indicator to provide feedback indicating when the collar is received in the housing. In particular, the connection indicator can be slidably carried by the collar and terminate on one end with a tip and on the other end with an indicator surface. The tip may contact the housing so as to move the indicator surface to either an elevated position or a co-planar position with respect to an adjacent surface portion of the collar thus providing feedback indicative of the connection between the collar and housing. Furthermore, the assembly may include a detent movable to a locked position to hold the collar in the latched position, by inserting an end of the detent in an aperture formed in the housing. The aperture may have an inner diameter that is smaller than the outer diameter of the tip of the connection indicator, such that the aperture does not receive the tip.

BRIEF DESCRIPTION OF THE DRAWINGS

Embodiments of the invention will now be described by way of example in greater detail with reference to the attached figures, in which.

DETAILED DESCRIPTION

Figure 1:
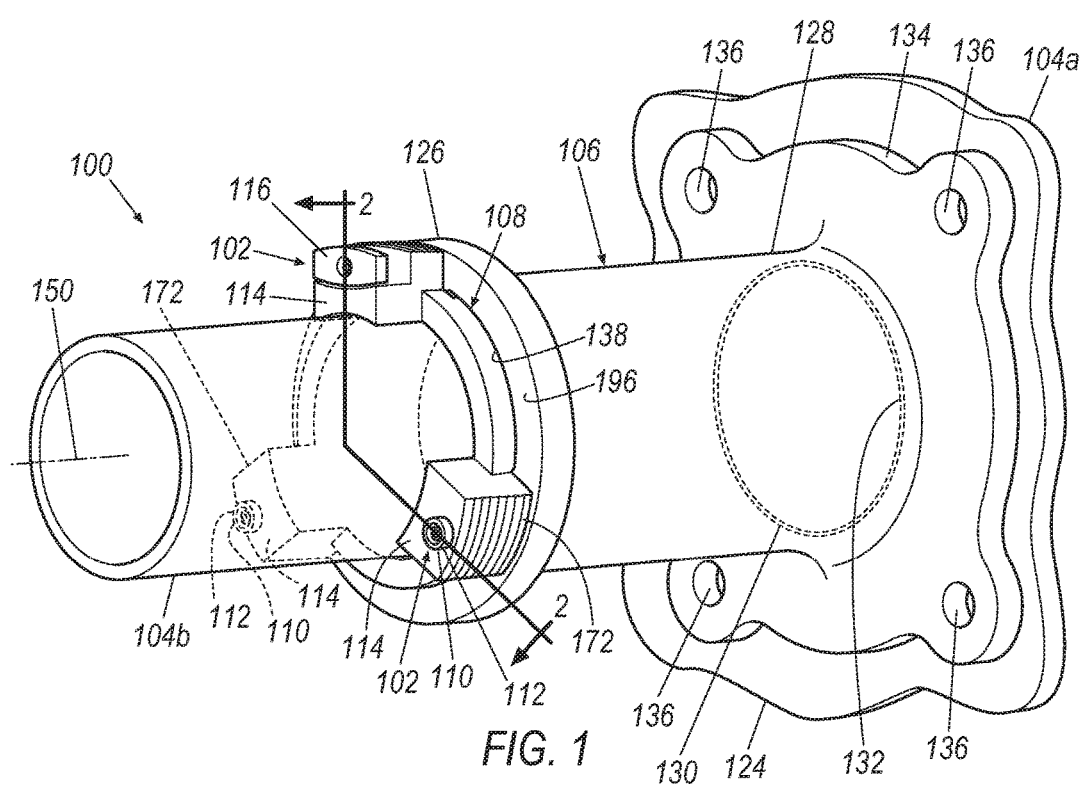
FIG. 1 is a perspective view of an exemplary feedback bulkhead connector assembly providing feedback indicating that the assembly is disposed in a locked position to hold corresponding fluid handling components in fluid communication with one another.

Referring now to the discussion that follows and also to the drawings, illustrative approaches are shown in detail. Although the drawings represent some possible approaches, the drawings are schematic in nature and thus not drawn to scale, with certain features exaggerated or removed to better illustrate and explain the present disclosure. Further, the descriptions set forth herein are not intended to be exhaustive or otherwise limit or restrict the claims to the precise forms and configurations shown in the drawings and disclosed in the following detailed description.

Figure 2:
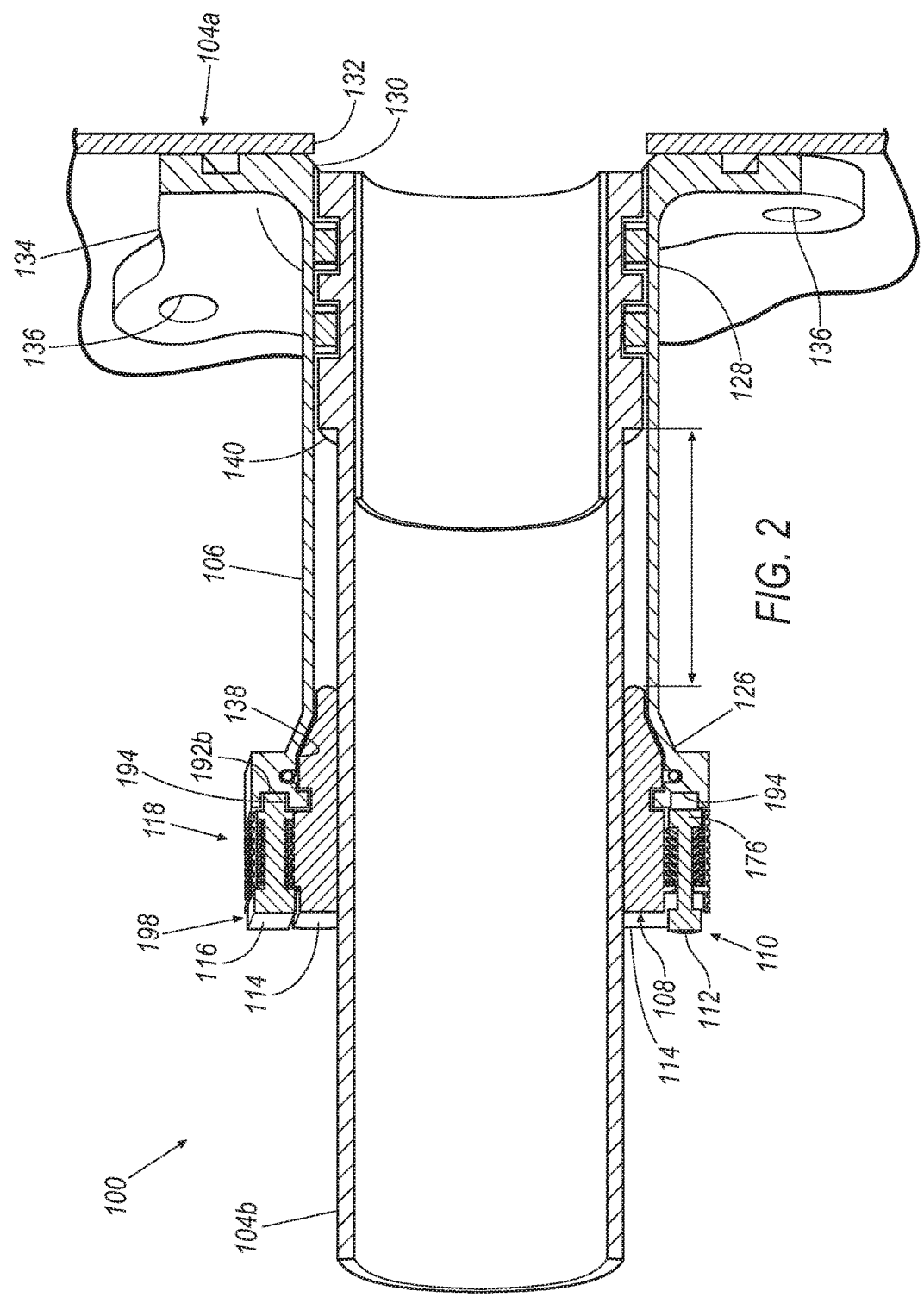
FIG. 2 is a cross-sectional view of the exemplary bulkhead connector assembly of FIG. 1, as taken along line 2-2.

Referring to FIGS. 1 and 2, an exemplary feedback bulkhead connector assembly 100 generally includes one or more feedback devices 102 that provide feedback in any combination of tactile, auditory and visual forms, to indicate whether two or more fluid handling components 104a, 104b of a fluid handling system (not shown) are fluidly connected to one another with a redundant locking mechanism facilitating a connection between those components. The assembly 100 may have a housing 106 and a collar 108, which are configured to attach corresponding fluid handling components 104 to one another. In this example, all components of the assembly 100 are manufactured from electrically conductive materials, and these components meet existing aerospace resistance requirements. However, one or more components may not be electrically conductive or have properties that are independent of aerospace requirements. Additionally, each one of the components includes an electrical bonding path to the conductive mounting flange face of the bulkhead flange. However, in other examples, one or more components of the assembly may not include an electrical bonding path to the conductive mounting flange face.

Figure 3A:
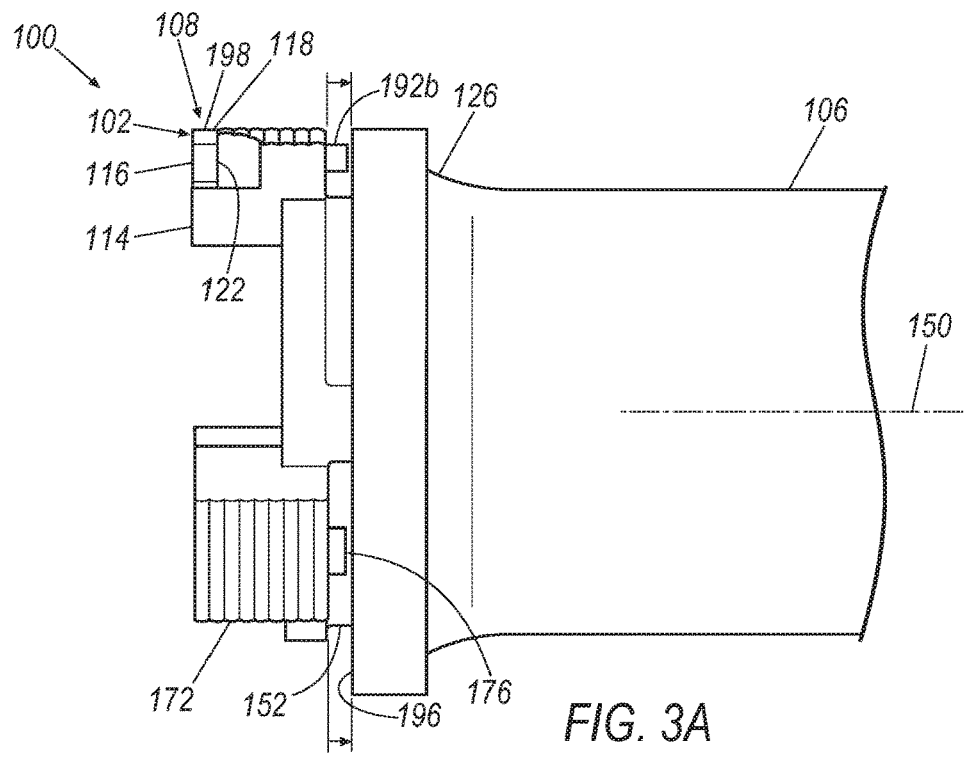
FIG. 3A is a side view of the assembly of FIG. 1, showing a collar having a plug portion being received within a housing along a longitudinal axis of the housing.
Figure 3B:
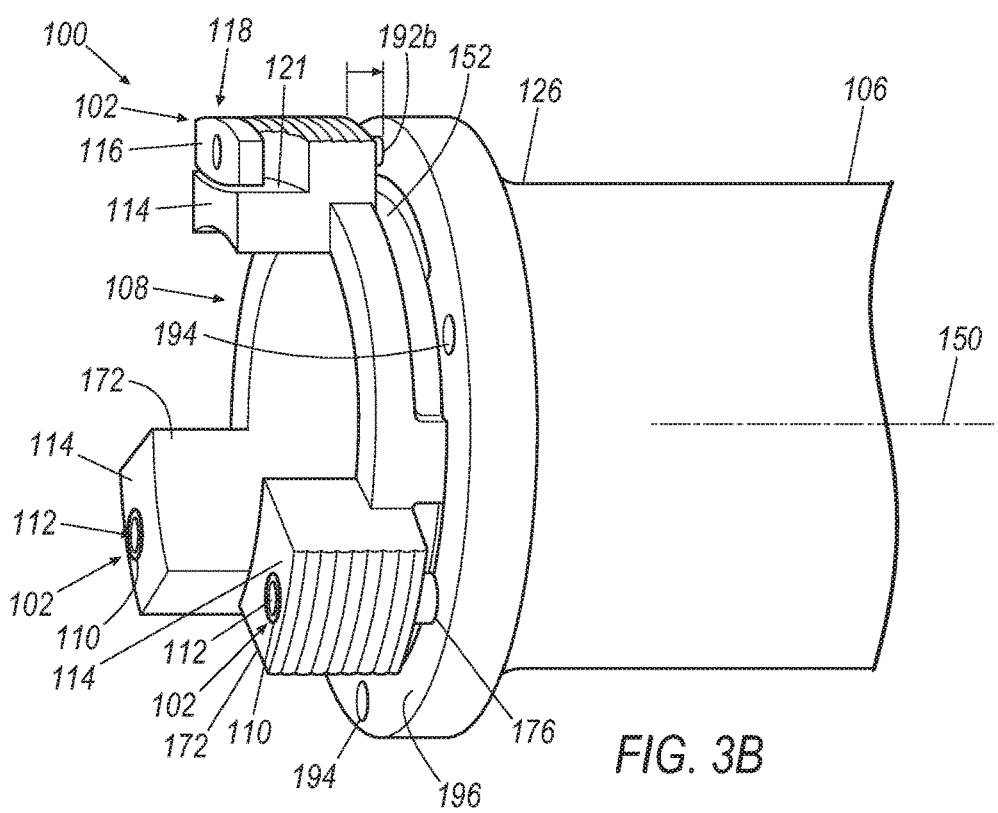
FIG. 3B is a perspective view of the assembly of FIG. 3A.
Figure 4:
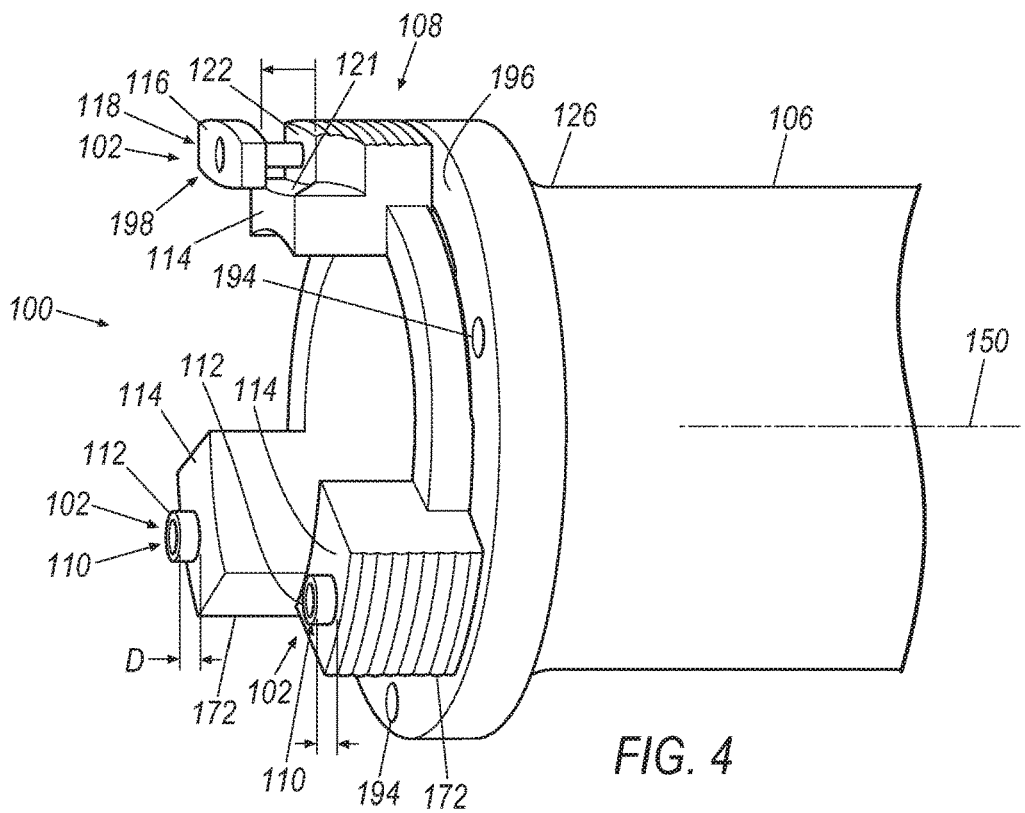
FIG. 4 is a perspective view of the assembly of FIG. 3B, showing the plug portion of the collar being fully received within the housing and the collar being disposed in an unlatched position.
Figure 5:
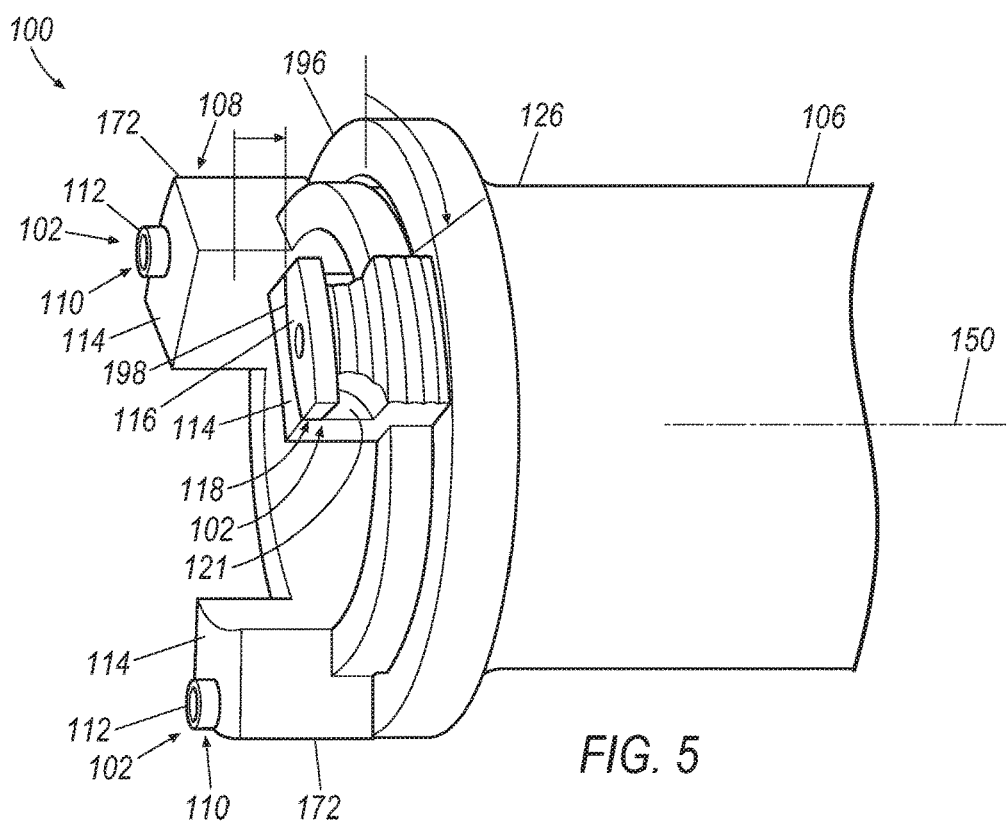
FIG. 5 is a perspective view of the assembly of FIG. 4, showing the collar being rotated from the unlatched position to a latched position, and a detent being moved from an unlocked position to a locked position.
Figure 6A:
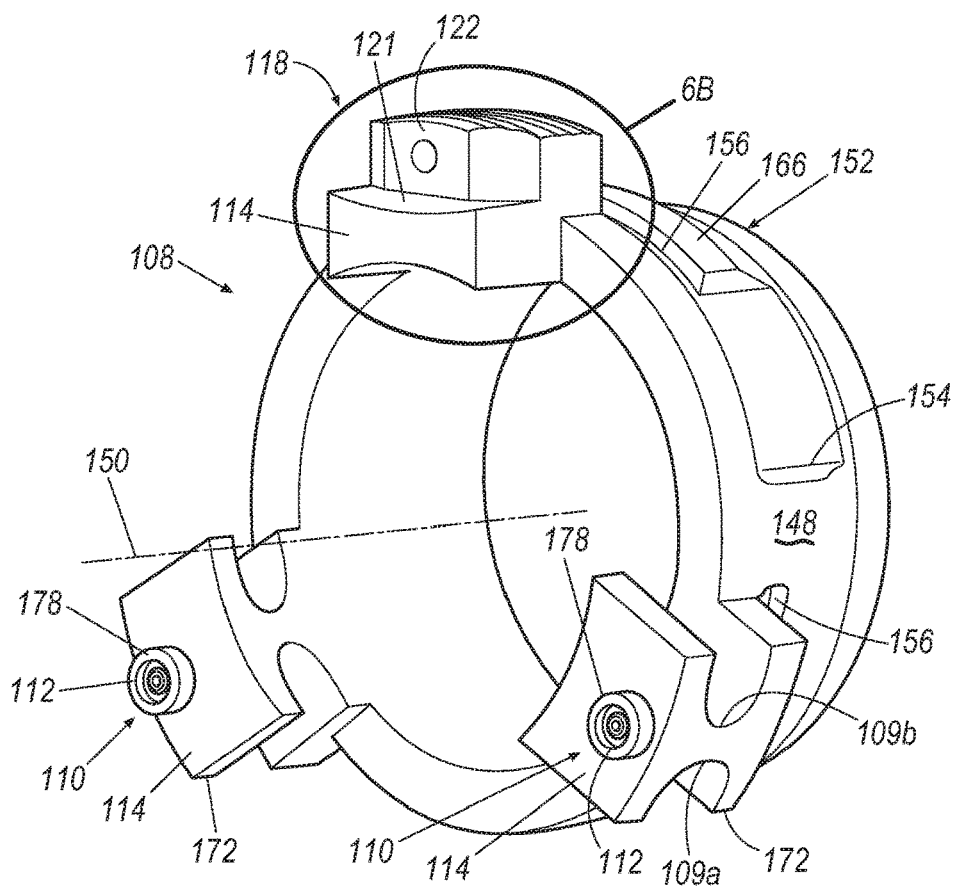
FIG. 6A is a perspective view of one exemplary end of the collar of FIG. 1 having scalloped knobs.

As shown in FIGS. 3B, 4 and 5, the exemplary feedback devices 102 can include two connection indicators 110 that provide visual and tactile feedback indicating the connection between corresponding fluid handling components. Examples of fluid handling components can include, but are not limited to, a bulkhead and a conduit, such as a fuel line. However, the assembly can instead be used to connect any conduits, fluid handling components or combinations thereof. Each indicator 110 may be slidably carried by a respective knob 172 or enlarged portion of the collar 108. As shown in FIG. 3B, each knob 172 can have a generally polyhedron shape including somewhat planar sidewall surfaces. On the other hand, as shown in FIG. 6A, other exemplary knobs 172 can instead have a non-polyhedron shape including a pair of scalloped sidewalls 109a, 109b configured to be handled by a user for installing or detaching the collar 108 from the housing 106.

Turning to FIG. 4, when the collar 108 is received in the housing 106, the indicators 110 can move to an engaged position to indicate the engagement or connection between the two components. In this example, each indicator 110 in the engaged position may have an indicating surface 112 that is elevated or spaced apart from an adjacent surrounding surface 114 of the collar 108 by a distance D, thus providing at least the tactile feedback indicative of the connection. However, the indicating surface 112 can instead identify a connection when it is disposed in other positions, such as a co-planar with the adjacent surrounding surface 114 of the collar 108 or housing 106.

Figure 9A:
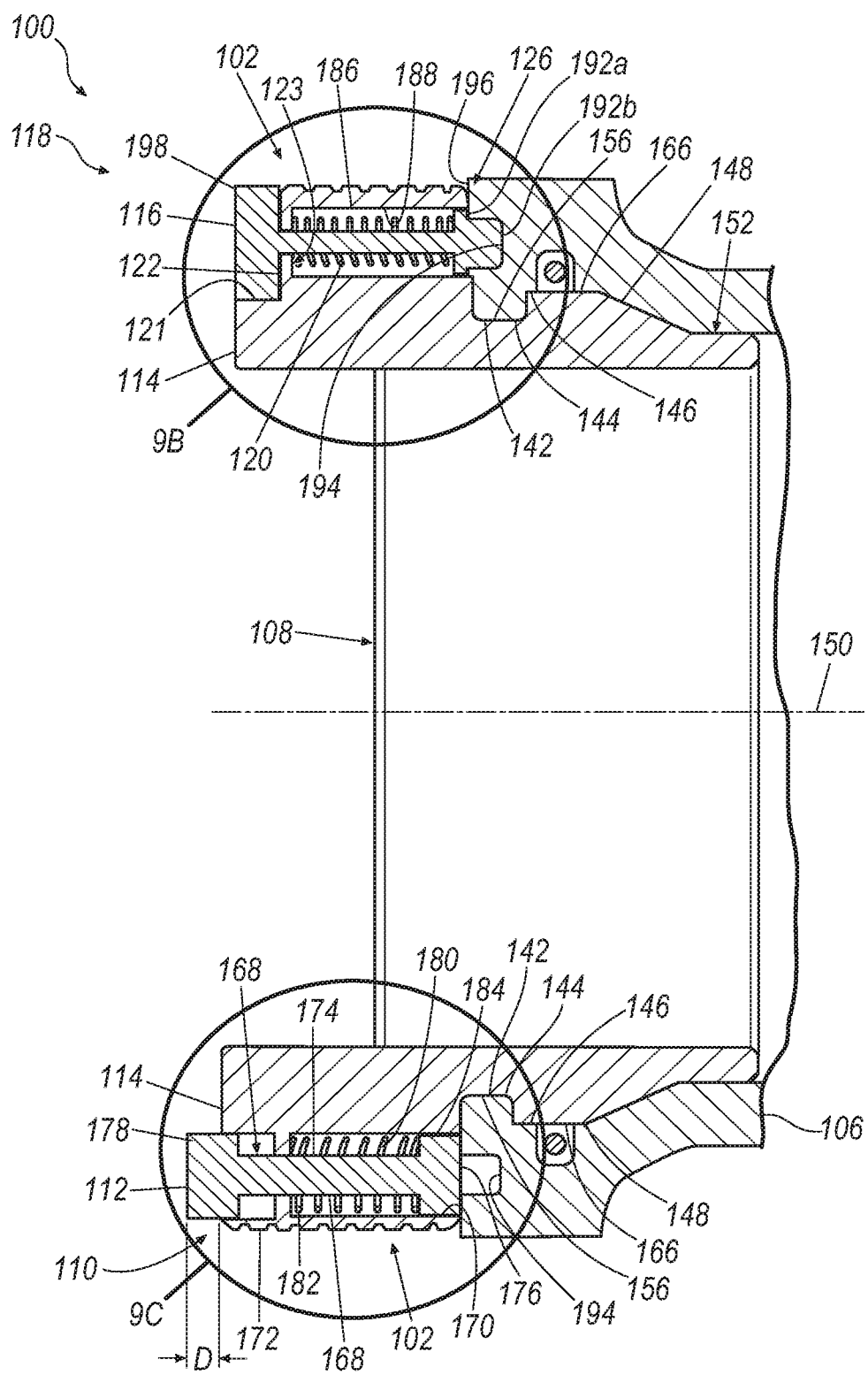
FIG. 9A is a cross-sectional view of the collar of FIG. 8, as taken along line 9-9.
Figure 9B:
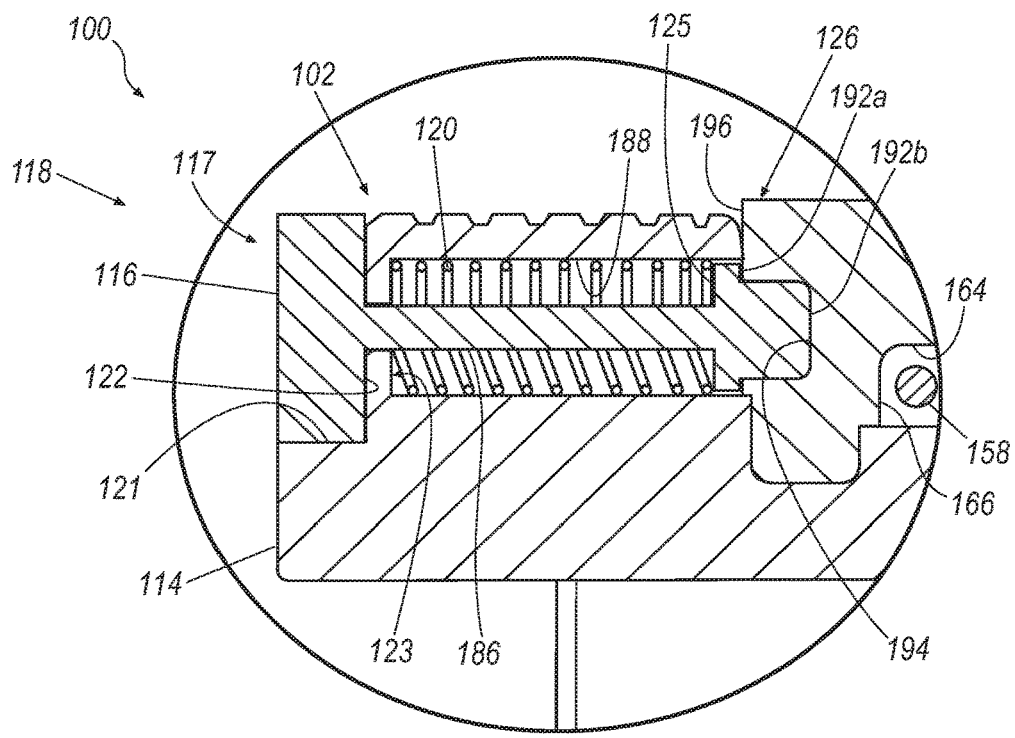
FIG. 9B is an enlarged view of the encircled portion 9B of the collar as taken from FIG. 9A, showing a locking plunger fully engaged and received within one locking opening formed in the housing.

Referring to FIGS. 2, 9A and 9B, the exemplary feedback device 102 can include an indexing surface 116 formed on a detent 118, which moves to a locked position and provides at least visual and tactile feedback indicating that corresponding fluid handling components are locked in fluid communication with one another. In the locked position (FIGS. 1 and 2), the indexing surface 116 can be co-planar with an adjacent surface 114 of the collar 108. However, other exemplary detents may include an indexing surface that indicates a connection when the indexing surface is elevated or spaced apart from an adjacent surface of the collar and/or the housing.

With specific attention to FIG. 9B, each detent 118 can further include a first biasing member 120, which moves the detent 118 so as to impact another surface and produce auditory feedback indicating that the fluid handling components are locked in fluid communication with one another. For instance, the first biasing member 120 can be a spring sandwiched between a surface 123 of the collar 108 and an annular ridge of a detent plunger 117 so as to move the plunger 117 with sufficient speed and force to impact a surface 122 of the detent plunger onto a seat 121 formed on the collar 108, and simultaneously impact a plunger surface 192a onto the surface 196 of the housing 106, and thus generate a snapping sound, a clicking sound or other auditory feedback indicating that the detent 118 is disposed in the locked position.

Turning again to FIGS. 1 and 2, the assembly 100 can include a housing 106, which in this form is a bulkhead adapter that is mounted to a bulkhead 104a. In particular, as best shown in FIG. 2, the housing 106 may have first and second end portions 126, 128, and the second end portion 128 may define a second opening 130 that communicates with a port 132 formed in the bulkhead 104a. The second end portion 128 may also have an annular flange 134 including a series of spaced apart holes 136 used to receive a plurality of bolt fasteners (not shown) for attaching the housing 106 to the bulkhead 104a. However, the housing 106 can instead be attached to a tubing section or other suitable fluid handling components by various suitable fastening methods.

Figure 10:
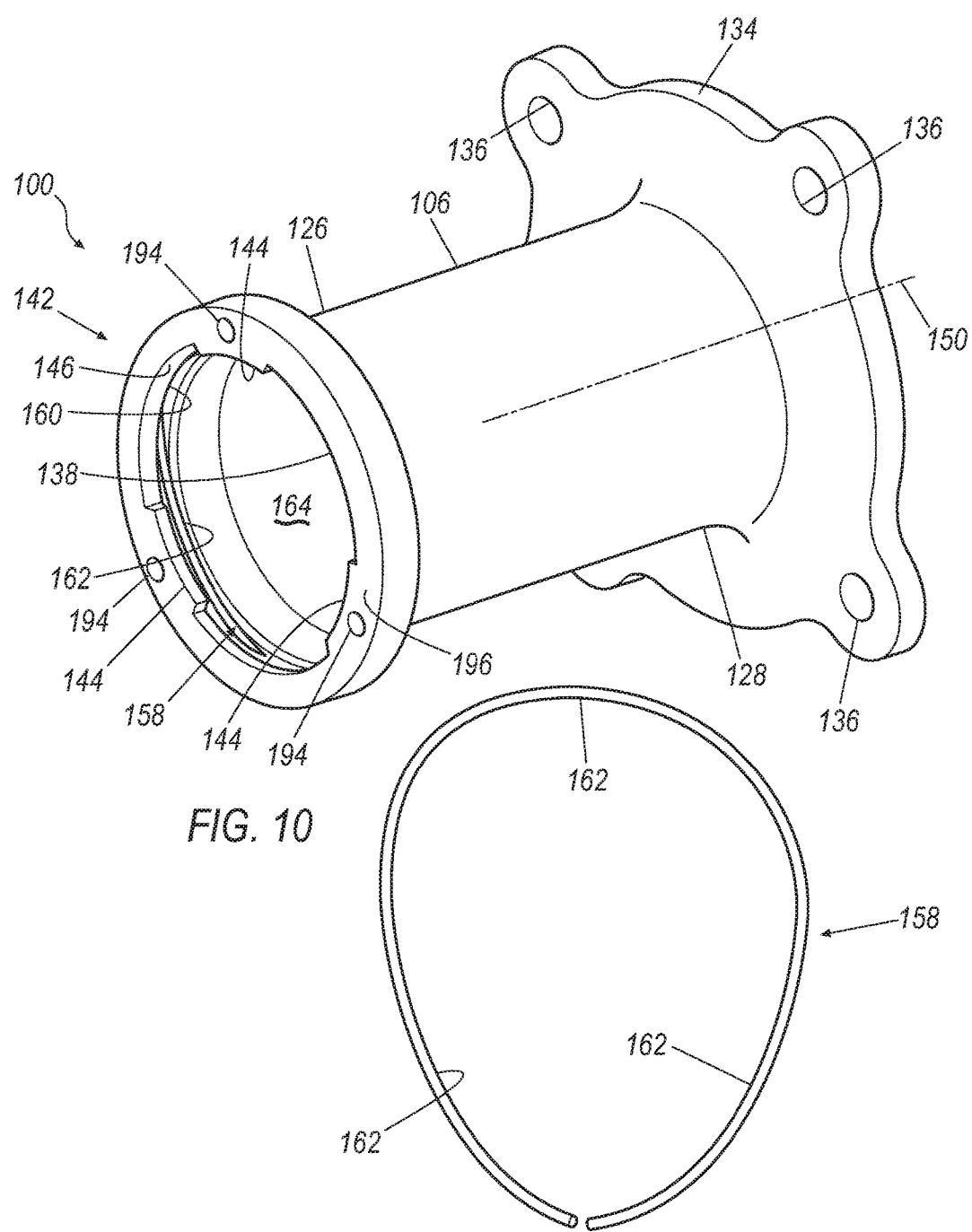
FIG. 10 is a perspective view of the housing of FIG. 1, showing the housing having a retainer integrally formed therein and a resilient bonding electrical device used to provide an electric connection between the collar and the housing when the collar is inserted into the housing.
Figure 11:
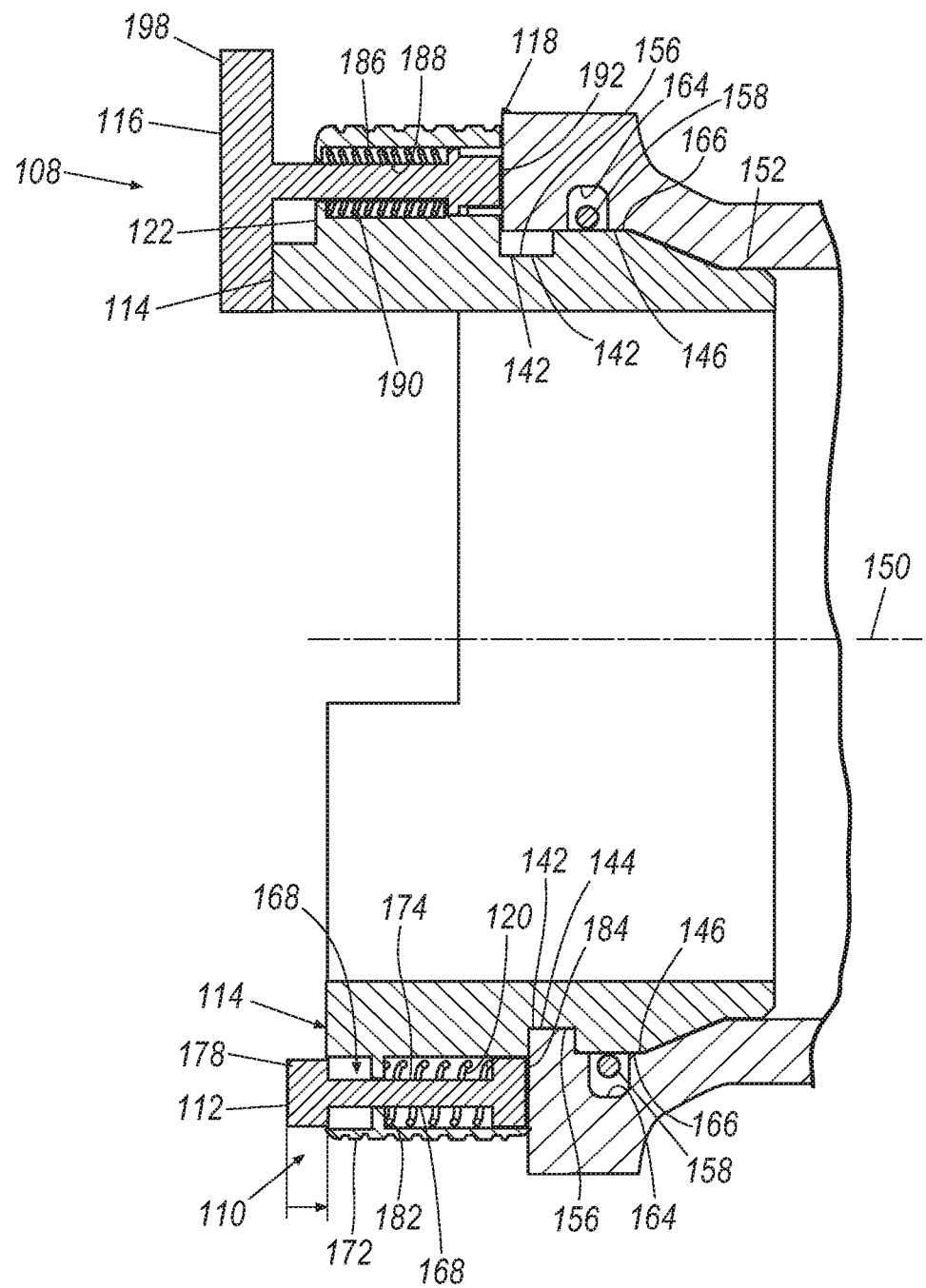
FIG. 11 is a cross-sectional view of exemplary collar of FIG. 9A, showing an unlocked collar received in the housing and disposed in the unlatched position.

Referring to FIGS. 2 and 10, the first end portion 126 of the housing 106 may define a first opening 138 that receives the collar 108 and the conduit 104b. The conduit 104b is slidably carried within the collar 108 to permit vibration and movement of the conduit 104b and the associated aircraft structure upon which the system is attached. In particular, the collar 108 has an inner diameter configured to slidably pass a portion of the conduit 104b therethrough up to an enlarged end portion 140 of the conduit 104b that has an outer diameter larger than the inner diameter of the collar 108. While in this embodiment the conduit 104b is a fuel line, the conduit 104b can instead be other suitable fluid handling components.

Figure 6B:
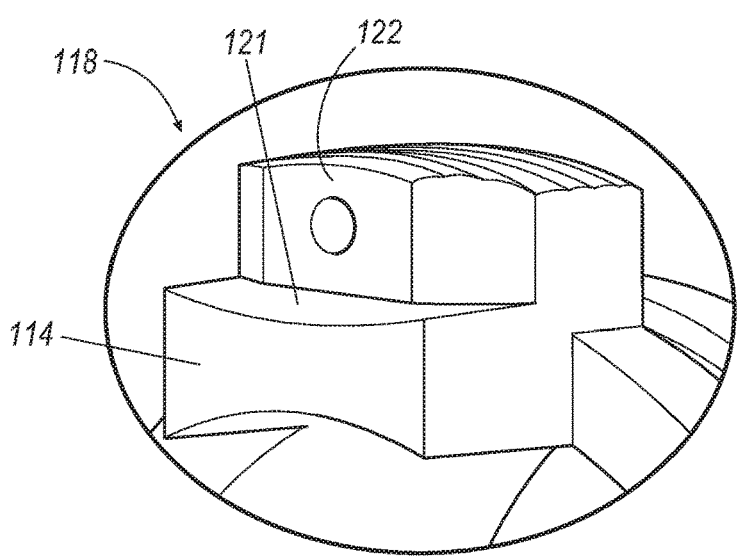
FIG. 6B is an enlarged view of the collar as taken from the encircled portion 6B of FIG. 6A.
Figure 7:
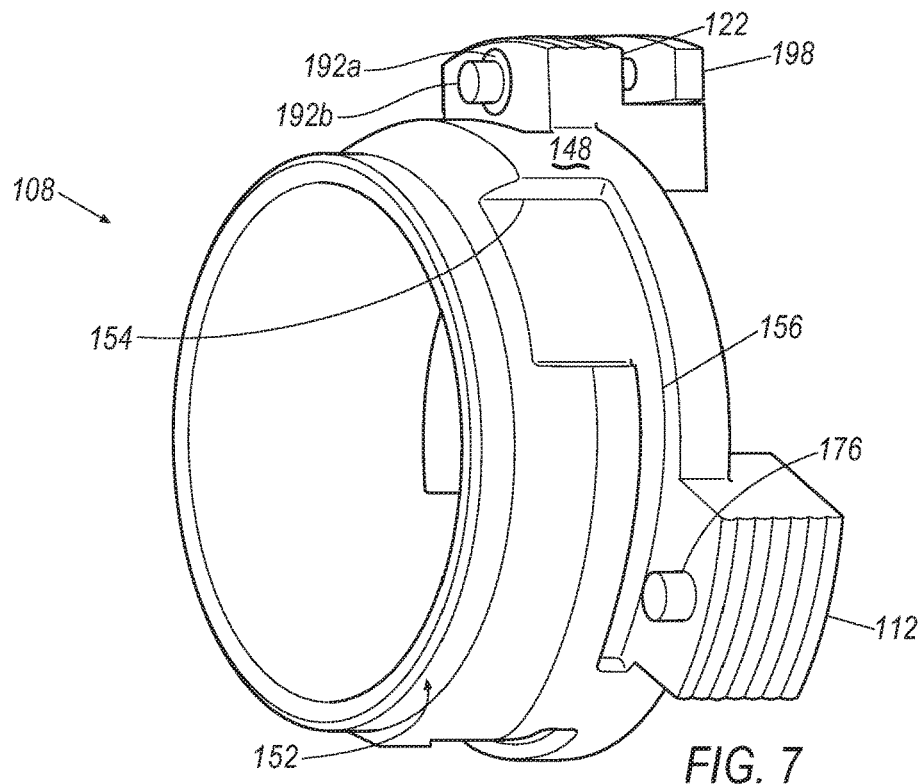
FIG. 7 is a perspective view of the other end of the collar of FIG. 6A.
Figure 8:
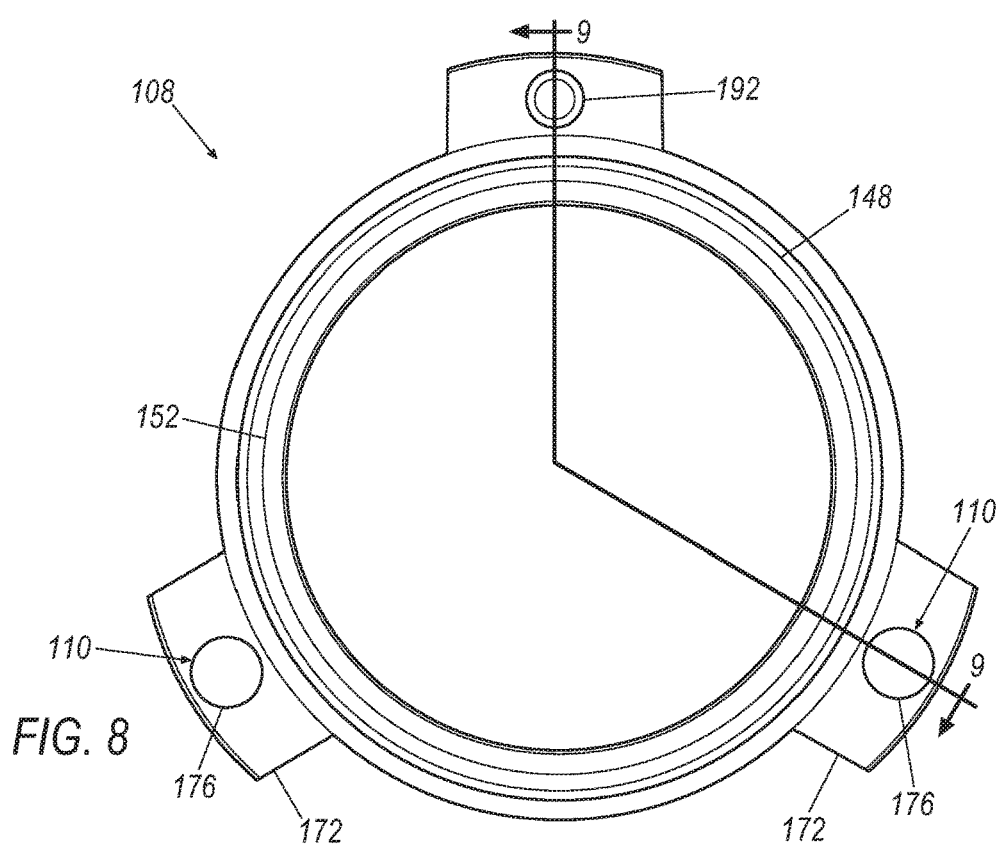
FIG. 8 is an end view of the collar of FIG. 7.

With specific attention to FIG. 10, a retainer 142 can be integrally formed in the housing 106 and used for attaching the collar 108 to the housing 106 when the collar 108 is rotated to its latched position. The retainer 142 in one form may include one or more protrusions 144, which extend radially inward from an inner surface 146 of the housing 106 and cooperate with the outer surface 148 (FIGS. 6A and 7) of the collar 108 to hold the collar 108 (FIGS. 6-8) in a fixed position along a longitudinal axis 150 of the housing 106. In particular, as best shown in FIGS. 6A and 7, the collar 108 may include a plug body 152 that has an outer surface 148 with one or more longitudinal slots 154 formed therein and disposed parallel to a longitudinal axis 150 of the housing 106 (FIG. 10). The collar 108 may be rotated to its unlatched position, such that the longitudinal slots 154 of the collar 108 are aligned with the protrusions 144 of the retainer 142 for receiving the same, which in turn permits the plug body 152 to be inserted into or removed from the housing 106 in a direction along the longitudinal axis 150 of the housing 106. Furthermore, turning again to FIGS. 6A and 7, the outer surface 148 of the plug body 152 may have one or more lateral slots 156 formed therein, which extend from the longitudinal slots 154 in a direction along an outer circumference of the collar 108. In this respect, the collar is rotatable between the unlatched position and a lateral position in which the lateral slots 156 receive corresponding protrusions 144 of the retainer 142. In this respect, the retainer 142 and the outer surface 148 of the collar 108 cooperate to hold the collar 108 and the conduit 104b in the housing 106. In other embodiments, the retainer may instead be integrally formed in the collar or be a separate component attached to the housing or the collar.

As shown in FIG. 10, a resilient bonding electrical device 158 can be carried by the housing 106 and used to provide the retainer 142 with an electrical bonding connection, current path or circuit. However, the resilient bonding device may instead be carried by the collar or be integrally formed in the housing or the collar. The resilient bonding device 158 in one form may be a split ring, which is received in an annular groove 160 formed in an inner surface 146 of the housing 106. The split ring may have one or more resilient segments 162 extending from the groove 160 and into a cavity 164 of the housing 106. In this respect, the resilient segments 162 may press against the outer surface 148 of the collar 108, e.g. lands 166 or other elevated surface portions of the collar 108, and provide a highly biased electric connection between the collar 108 and the housing 106, when the collar 108 is inserted in the housing 106.

Figure 9C:
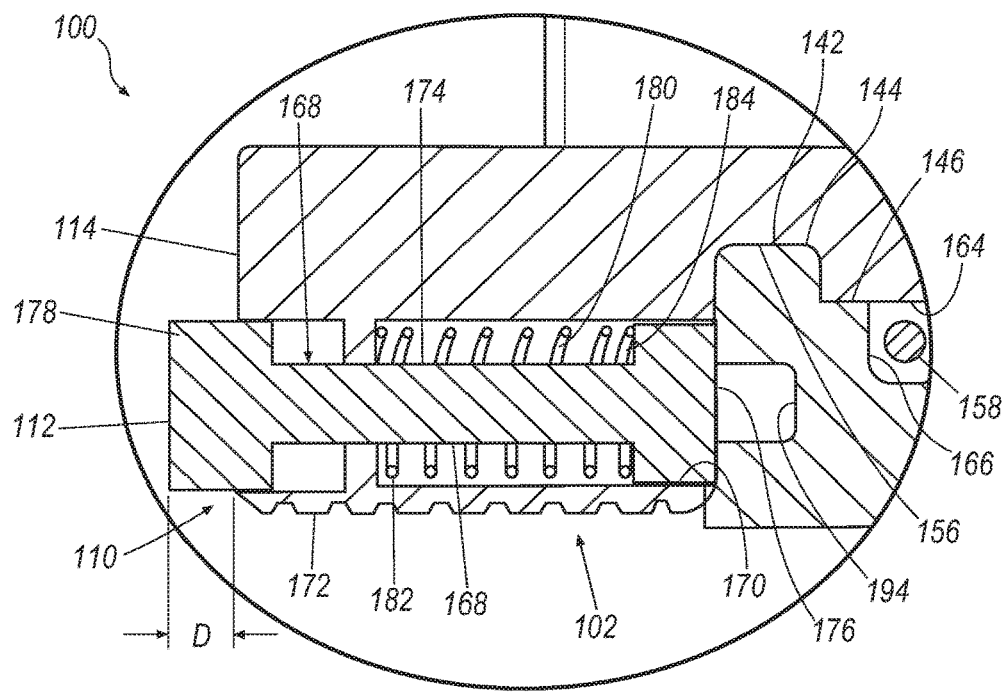
FIG. 9C is an enlarged view of the encircled portion 9C of the collar as taken from FIG. 9A, showing a feedback device indicating that the collar has been fully received within the housing along a longitudinal direction of the housing.

FIGS. 9A and 9C illustrate the exemplary assembly 100 having two connection indicators 110 that provide at least visual and tactile feedback indicating that the conduit 104b and the bulkhead 104a are joined to one another. In particular, as best shown in FIG. 9C, each indicator 110 is slidably carried by the collar 108. The exemplary indicator 110 can include a plunger 168 that is movable between the engaged position and a retracted position along an open-ended channel 170, which is formed in the respective knob 172 of the collar 108. The plunger 168 can include a shaft 174 that terminates on one end with a head 176. The head 176 may be configured to contact the housing 106 when the collar 108 is received within the same, so as to move the indicator 110 to the engaged position. The indicator 110 can further include an end cap 178 that extends from an end of the shaft 174 opposite to the head 176. The end cap 178 may have an indicator surface 112 that is disposed in a predetermined position, e.g. an elevated position, with respect to an adjacent surface area 114 of the collar 108 to provide at least visual and tactile feedback indicating the connection between the conduit 104b and the bulkhead 104a. The first biasing member 180 can move the plunger 168 toward a retracted position in which the plunger 168 is drawn within the collar 108. For instance, the second biasing member 180 may be a helical spring having one end 182 seated on the collar 108 and an opposing end 184 seated on the head 176 of the indicator 110. However, the assembly 100 can have more or less than two indicators that are disposed on any portion of the collar or the housing.

Referring again to FIG. 9B, a detent 118, such as a redundant lock, is configured to move to a locked position and hold the collar 108 in the latched position. The detent 118 has an indexing surface 116 that provides at least tactile feedback indicating that the collar is locked in the latched position. In particular, the detent 118 is carried by one of the knobs 172 extending from the collar 108 and is inserted into an aperture 194 formed in the housing 106 when detent 118 is moved to the locked position. One example of the detent 118 can include a post 186 that is slidably carried within a channel 188 formed in the collar 108. Moreover, the first biasing member 120, such as the helical spring, may be compressed between the collar 108 and the post 186 so as to move a tip 192b of the post 186 into an aperture 194 formed in an end face 196 of the housing 106 and hold the collar 108 in its latched position. The first biasing member 120 has a coefficient of stiffness to impact the post 186 onto the collar 108 with sufficient speed and force, such that the detent 118 generates a snapping sound, a clicking sound or other auditory feedback indicating the that detent has moved to the locked position. The detent 118 can further include a locking pawl 198 carried by an end of the post 186 that is opposite to the tip 192b. The locking pawl 198 can have an indexing surface 116 that is co-planar with respect to an adjacent surface portion 114 of the collar 108, so as to provide visual and tactile feedback indicating that the detent 118 has locked the collar 108 in the latched position. However, the indexing surface of the locking pawl can instead be sized or arranged on the post, such that the indexing surface may be elevated or spaced apart from the adjacent surface portion of the collar by a distance, to provide the visual and tactile feedback indicative of the same condition. The adjacent surface portion 114 can be part of the collar 108, the housing 106 or other suitable portion of the assembly.

Figure 12:
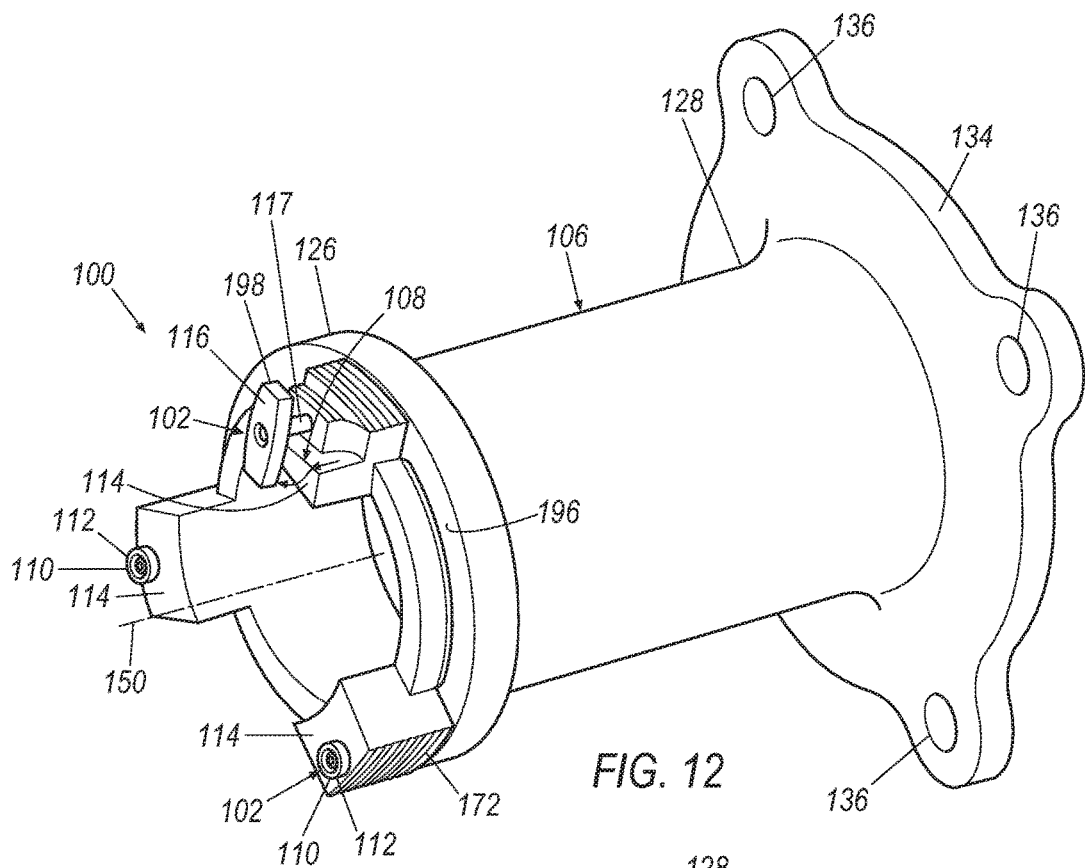
FIG. 12 is a perspective view of the assembly including the unlocked collar of FIG. 1.
Figure 13:
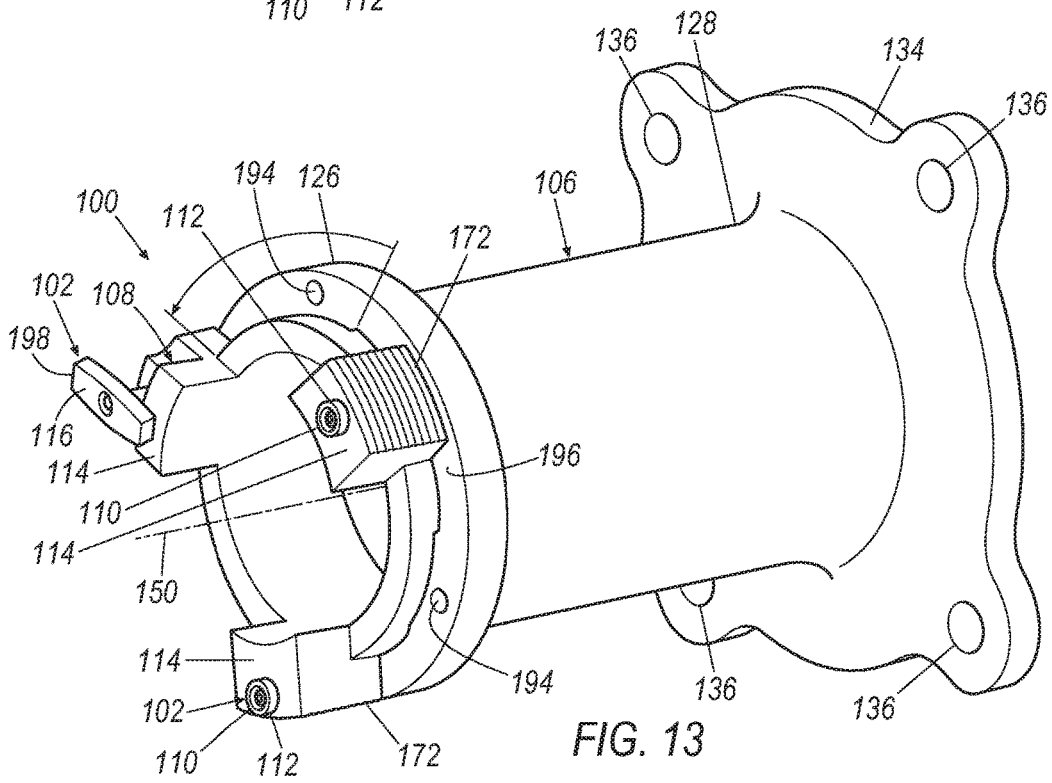
FIG. 13 is a perspective view of the assembly including the unlocked collar of FIG. 12, showing the collar being rotatable from the latched position to the unlatched position.
Figure 14:
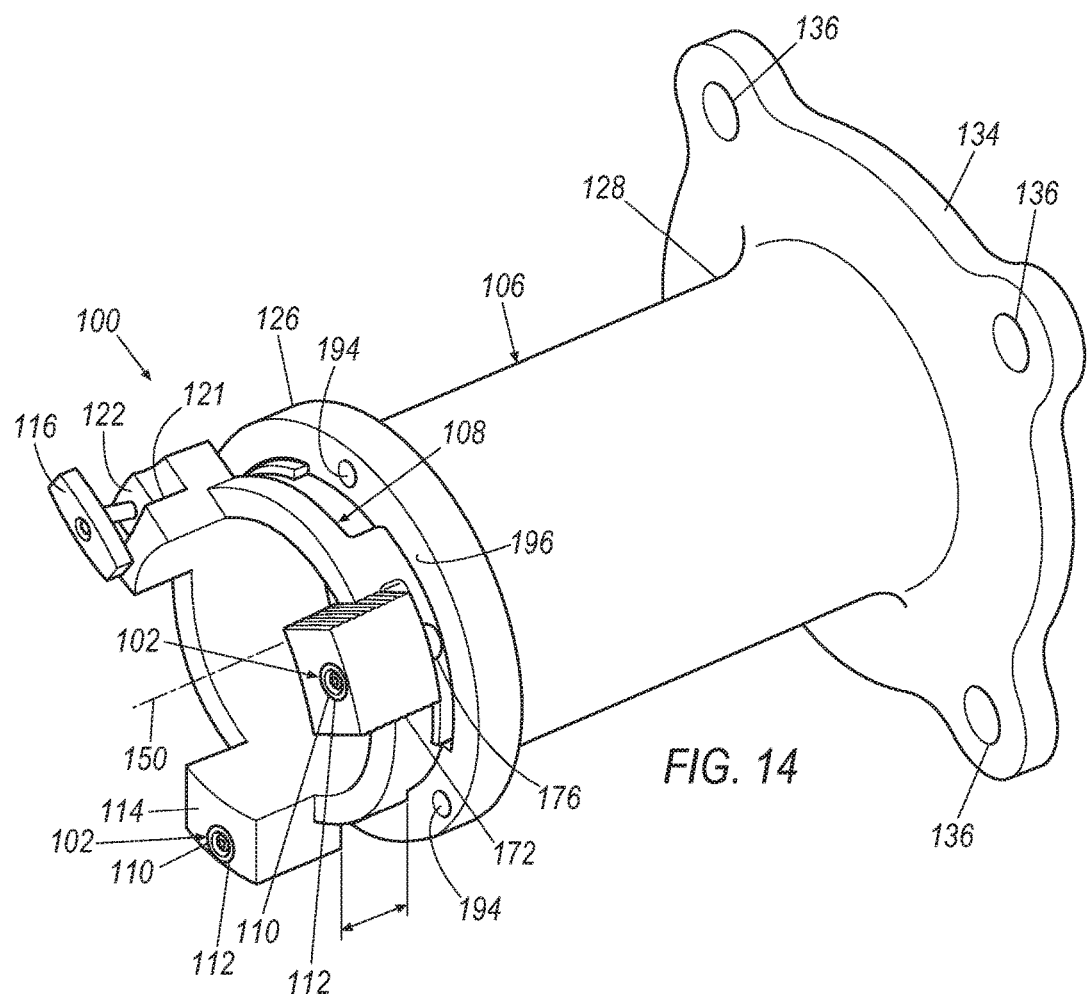
FIG. 14 is a perspective view of the assembly of FIG. 13, showing the connection indicators indicating that the collar is being removed from the housing thus disconnecting the corresponding fluid handling components.

FIGS. 12-14 illustrate operation of the assembly 100 to disconnect the conduit 104b (FIG. 1) from the bulkhead 104a. In particular, as shown in FIG. 12, an individual may disengage the redundant lock by pulling and moving the locking pawl 198 from its locked position to its unlocked position, so as to remove the tip 192b of the detent plunger 117 from the aperture 194 in the collar 108. The individual may then pivot the locking pawl 198 on the shaft 174 by, for example, 90 degrees, so as to abut the locking pawl 198 against the collar 108 and prevent the first biasing member 120 (FIG. 9B) from returning the detent 118 to its locked position. As shown in FIG. 13, the detent 118 in the unlocked position permits the collar 108 to be rotated from the latched position toward the unlatched position. With attention to FIG. 14, the collar 108 in the unlatched position may be pulled along the longitudinal axis of the housing 106 to remove the collar 108 and the conduit 104b (FIG. 1) from the housing 106 and thus disconnect the conduit 104b from the bulkhead 104a (FIG. 1).

The components of the assembly may be made of any suitable materials using various manufacturing processes. As one non-limiting example, the housing 106 and the collar 108 may be made of metallic materials, such as aluminum, stainless steel or titanium. When the housing 106 or the collar 108 is made of metallic material, these components may be manufactured by injection molding, compression molding then machining, extrusion then machining, other suitable processes or any combination thereof. As another non-limiting example, the housing 106 or the collar 108 may be made of an electrically conductive composite, including but not limited to polyetheretherketone (PEEK), polyamide or acrylonitrile-butadiene-styrene (ABS), and these components may be manufactured utilizing injection molding, compression molding then machining, extrusion then machining, as well as other suitable processes or combinations thereof. The bonding device 158, the biasing member 120 or the helical spring 182 may be manufactured from metal wire, including but not limited to stainless steel (302, 304, 17-7PH), nickel, a non-iron base alloy such as a Co—Cr—Ni alloy (e.g., Elgiloy which consists of 39-41% Cobalt, 19-21% Chromium, 14-16% Nickel, 11.3-20.5% Iron, 6-8% Molybdenum, and 1.5-2.5% Manganese) or other suitable materials, by machine coiling then tempering the coil. As still other non-limiting examples, the indicator 110, the plunger 168, the end cap 178, the detent plunger 117 or the post 186 may be machined from any metal bar stock, such as stainless steel 304.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A bulkhead connector assembly, comprising:
   a housing having a first opening and a second opening;
   a collar having a portion received within one of the first and second openings, and the collar is rotatable to a latched position and holds a conduit within the housing when the collar is disposed in the latched position;
   a detent movable to a locked position and holding the collar in the latched position when the detent is moved to the locked position;
   a retainer holding the collar within the housing when the collar is rotated to the latched position; and
   a resilient bonding electrical device carried by the housing and having at least one segment extending into a cavity of the housing, and the at least one segment cooperates with an outer surface of the collar to provide an electric connection between the collar and the housing when the collar is inserted into the housing;
   wherein the detent in the locked position has an indicator surface providing at least a tactile feedback indicating that the detent is holding the collar in the latched position.

2. The bulkhead connector assembly of claim 1, wherein the collar is rotatable between the latched position and an unlatched position, and the conduit is slidable through one of the first and second openings when the collar is disposed in the unlatched position.

3. The bulkhead connector assembly of claim 1, wherein the retainer is at least one protrusion extending radially inward from an inner surface of the housing and cooperating with an outer surface of the collar to hold the collar in a fixed position along a longitudinal axis of the housing when the collar is disposed in the latched position.

4. The bulkhead connector assembly of claim 1, wherein the collar has an outer surface including at least one longitudinal slot disposed parallel to the longitudinal axis of the housing, and the at least one longitudinal slot passes a portion of the retainer therethrough when the collar is disposed in the unlatched position and received within the housing.

5. The bulkhead connector assembly of claim 1, wherein the collar has an outer surface including at least one lateral slot extending along an outer circumference of the collar, and the at least one lateral slot receives the retainer when the collar is rotated from the unlatched position to the latched position.

6. The bulkhead connector assembly of claim 1, wherein the collar in the latched position permits the conduit to vibrate in the assembly, and the collar has an inner diameter and is configured to slidably pass a portion of the conduit therethrough up to an enlarged end portion of the conduit that has an outer diameter larger than the inner diameter of the collar.

7. The bulkhead connector assembly of claim 1, wherein the indicator surface is co-planar with an adjacent surface portion of at least one of the housing and the collar, when the detent is disposed in the locked position.

8. The bulkhead connector assembly of claim 1, wherein the indicator surface is elevated with respect to an adjacent surface portion of at least one of the housing and the collar, when the detent is disposed in the locked position.

9. The bulkhead connector assembly of claim 1, wherein the detent is carried by one of the housing and the collar, and movable into an aperture formed in the other of the housing and the collar when detent is moved to the locked position.

10. The bulkhead connector assembly of claim 1, further comprising a biasing member moving the detent to the locked position such that the detent impacts one of the housing and the collar to generate an auditory feedback indicating that the detent is disposed in the locked position.

11. The bulkhead connector assembly of claim 1, wherein the collar is movable from the latched position to an unlatched position when the detent is disposed in an unlocked position.

12. The bulkhead connector assembly of claim 1, wherein the housing is configured to attach to a bulkhead and fluidly communicate the other of the first and second openings with a port formed in the bulkhead.

13. A bulkhead connector assembly, comprising:
a housing having a first opening and a second opening;
a collar having a portion received within one of the first and second openings, and the collar is rotatable to a latched position and holds a conduit within the housing when the collar is disposed in the latched position;
a connection indicator carried by the collar, and the connection indicator includes an indicator surface that is movable relative to an adjacent surface portion of the collar to indicate when the collar is received in the housing;
a detent movable to a locked position and holding the collar in the latched position when the detent is moved to the locked position;
wherein the detent has a locking pawl having an indexing surface that provides at least a tactile feedback indicating that the detent is in the locked position and is holding the collar in the latched position; and
wherein the locking pawl is rotatable about an axis of the detent between a first position in which the detent is movable between the locked position and the unlocked position, and a second position in which the locking pawl engages an adjacent surface portion of at least one of the housing and the collar to prevent the detent from moving into the locked position.

14. The bulkhead connector assembly of claim 13, further comprising a retainer holding the collar within the housing when the collar is rotated to the latched position.

15. The bulkhead connector assembly of claim 14, wherein the connection indicator has one end contacting the housing when the collar is received in the housing, such that the indicator surface is one of elevated and co-planar with respect to an adjacent surface portion of one of the collar.

16. The bulkhead connector assembly of claim 13, further comprising:
a retainer holding the collar within the housing when the collar is rotated to the latched position; and
a resilient bonding electrical device carried by the housing and having at least one segment extending into a cavity of the housing, and the at least one segment cooperates with an outer surface of the collar to provide an electric connection between the collar and the housing when the collar is inserted into the housing.

17. The bulkhead connector assembly of claim 16, wherein the detent in the locked position has an indicator surface providing the tactile feedback indicating that the collar is received in the housing.

18. A bulkhead connector assembly, comprising:
a housing having a first opening and a second opening;
a collar having a portion received within one of the first and second openings, and the collar is rotatable to a latched position and holds a conduit within the housing when the collar is disposed in the latched position;
a detent carried by the collar and movable to a locked position in which an end of the detent is received in an aperture formed in the housing to hold the collar in the latched position;
a connection indicator carried by the collar, and the connector indicator terminating on one end with a tip and on another end with an indicator surface;
a retainer holding the collar within the housing when the collar is rotated to the latched position; and
a resilient bonding electrical device carried by the housing and having at least one segment extending into a cavity of the housing, and the at least one segment cooperates with an outer surface of the collar to provide an electric connection between the collar and the housing when the collar is inserted into the housing;
wherein the tip contacts the housing to move the indicator surface to one of an elevated position and a co-planar position with respect to an adjacent surface portion of the collar to indicate that the collar is received in the housing; and
wherein the tip of the connection indicator has an outer diameter that is larger than an inner diameter of the aperture of the housing, so as to provide a tactile feedback that the collar is received within the housing.

19. The bulkhead connector assembly of claim 18, wherein the detent in the locked position has an indicator surface providing at least the tactile feedback indicating that the detent is holding the collar in the latched position.

* * * * *